June 26, 1928.

J. V. PUCCINI ET AL 1,674,874

CORE AND METHOD OF MAKING THE SAME

Filed Nov. 26, 1924     4 Sheets-Sheet 1

INVENTORS
Joseph V. Puccini
and
William L. Guise
BY
Mayer Warfield & Watson
ATTORNEYS June 26, 1928.

J. V. PUCCINI ET AL 1,674,874

CORE AND METHOD OF MAKING THE SAME

Filed Nov. 26, 1924      4 Sheets-Sheet 2

INVENTORS
Joseph V. Puccini
and
William L. Guise
BY
Mayer, Warfield & Watson
ATTORNEYS June 26, 1928.
J. V. PUCCINI ET AL
1,674,874
CORE AND METHOD OF MAKING THE SAME
Filed Nov. 26, 1924     4 Sheets-Sheet 4
Fig. 12
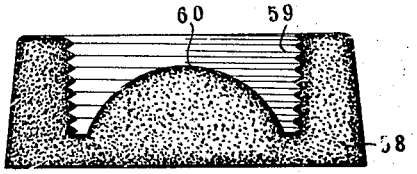
Fig. 14
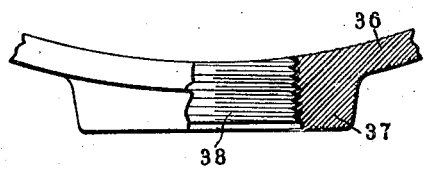
Fig. 15
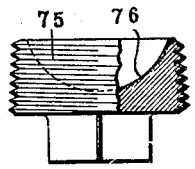
Fig. 16
INVENTORS
Joseph V. Puccini
William L. Guise
BY
Mayer, Warfield and Watson
ATTORNEYS Patented June 26, 1928.

1,674,874

UNITED STATES PATENT OFFICE.

JOSEPH VIRGIL PUCCINI AND WILLIAM L. GUISE, OF DOVER, NEW JERSEY, ASSIGNORS TO HENRY THOMAS RICHARDSON, OF NEW YORK, N. Y.

CORE AND METHOD OF MAKING THE SAME.

Application filed November 26, 1924. Serial No. 752,364.

This invention relates to a method of forming screw-threads in an improved manner, together with apparatus for practicing the method, as well as producing articles having screw-threads which will be more desirable than articles of a similar nature as heretofore provided.

It is an object of the present invention to provide a method of forming screw-threads, which method will be of particular value when utilized in the metal casting industry, and by means of which a commercially desirable screw-thread may be formed in an article or unit simultaneously with the casting thereof.

It is a further object of this invention to form screw-threads of any characteristic desired, which threads will be more desirable than similar types of threads as heretofore constructed.

It is a further object, by means of the present invention, to eliminate to the greatest extent certain expenses heretofore regarded as a necessary incident to casting, in that by means of the present invention it is proposed to dispense to the greatest extent with machining operations which have heretofore been viewed as essential to the formation of screw-threads in cast parts, aside from the fact that the breakage and mutilation of said parts incident to such machining as heretofore practiced will also be eliminated.

Another object is that of providing a method of forming screw-threads by means of which the objects sought may readily be accomplished, and which method will be economical in its practice and may be readily followed to produce virtually perfectly screw-threaded units.

Other objects of the invention will in part be obvious and will in part appear hereinafter.

The invention accordingly comprises the several steps and the relation and order of one or more of such steps with respect to each of the others, and the article possessing the features, properties, and the relation of elements which are exemplified in the following detailed disclosure, and the scope of the application of which will be indicated in the claims.

For a fuller understanding of the nature and objects of the invention reference should be had to the following detailed description taken in connection with the accompanying drawings, in which:

Fig. 12 is a sectional view of such core;

Fig. 14 is a view similar to Fig. 12, but showing the type of core produced by the mechanism illustrated in Fig. 13; and Figs. 15 and 16 are partly sectional side views of the finished articles produced by the use of the cores shown respectively in Figs. 6 and 12.

Figure 1:
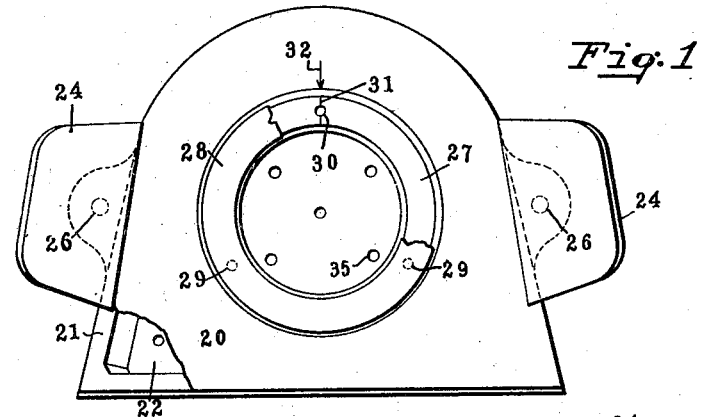
Fig. 1 is a plan view of one of the elements which may be utilized in the practice of the present method, and showing a portion thereof broken away to disclose the underlying construction.

In the foregoing views the method of forming the threads has been shown in connection with the industry of metal casting. It is to be understood, however, that the present invention is not necessarily limited to this particular industry, but may be successfully employed in other lines of endeavor where screw-threads are to be formed. Thus, presuming that it is desired to provide a threaded opening in a radiator, boiler section or similar unit—as has been shown, for example, in Fig. 15—according to the present exemplification a core is employed of the nature illustrated in Fig. 6. This core is formed by the use of the apparatus illustrated in Figs. 1 to 5, inclusive. With particular reference to these figures it will be observed that a core-box has been shown, which includes an inner plate 20, a shell or side walls 21, and a base of drier-plate 22. The plate 20 is formed with an inwardly-extending interiorly-screw-threaded collar 23, and extensions serving as handles 24 may form a part of this plate,—permitting of its ready manipulation. The shell has its walls extending inwardly toward the base-plate 22, and in order to hold the parts in proper relative position the latter preferably has a dove-tailed portions 25, which is adapted to cooperate with the similarly-shaped parts of the shell 21, while the plate 20 also preferably carries guides in the nature of pins 26, which are adapted to cooperate with suitable portions associated with the shell.

Figure 2:
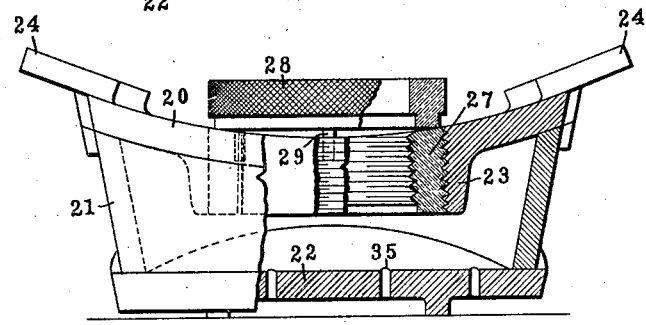
Fig. 2 is a partly fragmentary sectional face view of the device as shown in Fig. 1.
Figure 4:
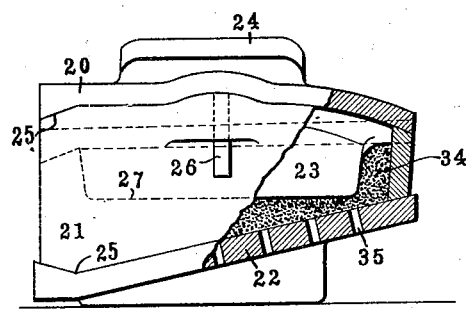
Fig. 4 is a partly fragmentary view of this device, showing the same packed with core material.
Figure 5:
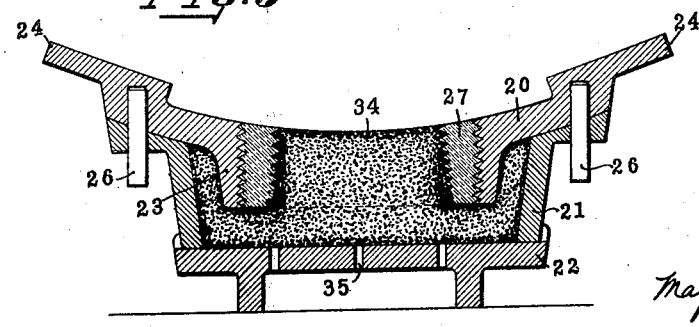
Fig. 5 is a transverse sectional view of the apparatus as shown in Fig. 4, with certain of the mechanism thereof removed.
Figure 3:
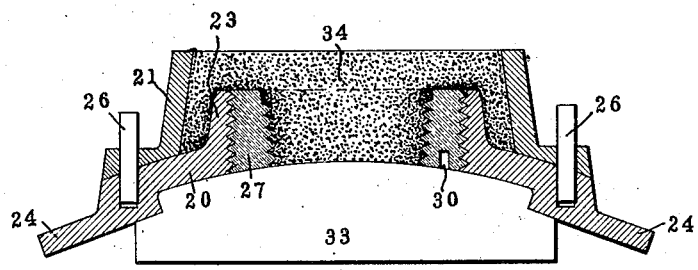
Fig. 3 illustrates the parts when they are inverted during one stage of the method.

It is here to be noted that the walls forming the shell extend toward each other adjacent their lowermost edges, as shown in Fig. 2, and the base- or drier-plate 22 is shaped to have its surfaces extend at an angle to each other, while the plate 20 is curved throughout its entire width. This construction is resorted to, having in mind that in the present instance it is desired to form a core section of the nature illustrated in Fig. 6, which section may be disposed in proper relation to other core sections within a mold. Thus, obviously the particular configuration of the sections of the core-box may be modified and changed according to the shape of the finished article which it is desired to produce.

Disposed within the collar 23, and exteriorly threaded to cooperate with the screw-threads of this collar, is a ring or cylinder 27.

In using this mechanism the following course is adopted: The ring 27 is primarily threaded into the collar 23, and this operation is continued until the ring is in proper position, this step being accomplished, for example, by means of the fingers of the workman, or, if desired, by means of a suitable wrench 28 having extensions 29 engageable with suitable recesses 30 formed in the upper side of the cylinder 27. In order to indicate the proper relative disposition of the parts any suitable expedient may be resorted to, as has—for example—been shown in Fig. 1. In this view it will be noted that the upper edge of the cylinder 27 carries an indication 31, and the upper face of the plate 20 also carries an indicating-mark 32, it being understood that when these marks are in registry they will serve as an indication that the parts are properly disposed with respect to each other.

Previous to these operations, or subsequent to the same, the shell or side walls 21 of the appliance are associated with the plate 20, and after the wrench 28 has been removed a cover 33 is applied to the outer face of this plate in order to close the open end of the cylinder 27. The parts are now inverted in the manner shown in Fig. 3, so that an open-faced receptacle is presented to an operator, which receptacle has a collar and a cylinder extending upwardly from its base.

The operator will now pack the interior of this receptacle with a mass of core-sand 34. While this substance may be of any desired character best adapted for the work in question, it is preferred that the following composition be utilized: 25 parts of tough silica sand of a very fine nature (i. e., such as will pass through a 100-mesh screen), one part of pure, raw linseed oil, this mass being thoroughly mixed and tempered with a sufficient amount of water to insure the establishment of a proper consistency.

After the receptacle or core-box has been thus packed the base- or drier-plate 22 is inverted and applied to bear against the outer edges of the side walls 21, care being taken that the sand is leveled off before the drier-plate or platform is applied. The entire unit is now again reversed, and the cover 33 is removed, as has been indicated in Fig. 5. At this time it is to be noted that it is usually necessary, after the removal of the cover, for an operator to scrape away that portion of the sand which may have slightly keyed beyond the edge of the cylinder during the packing operation.

Thus, the core-box will be filled with a mass of material, the shape of which conforms exactly to the interior surfaces of the cylinder 27, collar 23, walls 21, drier-plate or platform 22 and plate 20, and in order to permit this core to be finished, i. e., put in a condition where it may be used in a mold, the operator will now apply the wrench 28 to the cylinder and "back off" the latter until such time as, due to the curvature of the plate 20 a portion of the inner edge of the cylinder 27 is visible. At this time the plate 20 may be removed, carrying with it the cylinder, or, if desired, merely the latter may be removed and the plate may be left in position.

The reason for the permissibility of the foregoing operation will be obvious, in that in order to conform to standard practice the thread appearing on the inner face of the cylinder 27 is of increasingly great circumference, so that, although the thread on the outer face of the cylinder is in the present instance of constant circumference, the bore of the cylinder is tapered. The primary reason for this expedient is due to the fact that it is customary to provide a ¾-inch taper, i. e., a ¾-inch reduction per foot in the socket. As a result of conforming to this practice it will be apparent that as soon as the cylinder has been backed out, the threads on the inner face of this cylinder will have freed themselves from the corresponding threads forming a part of the core. As a consequence, the further the cylinder is "backed off" the greater the degree of spacing between the interior threads thereof and the threads of the core, as a result of which, when a portion of the lower edge of the cylinder is visible beyond or adjacent the plate 20 the operator may feel assured that the cylinder, together with the plate, if desired, may be lifted clear of the side walls 21. In this connection it is to be noted in the present instance that that face of the collar 23 which is in contact with the mass of core material is also tapered so that no binding of the parts will result, and consequently, no difficulty will be encountered in removing the portions above referred to.

Figure 6:
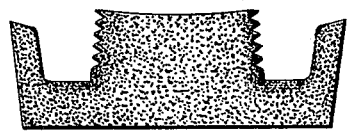
Fig. 6 illustrates the core produced by the use of a mechanism such as has been shown in the foregoing figures.

Thus, an operator will have a receptacle, i. e., the drier-plate and shell walls 21, and resting within this receptacle will be a core of the nature illustrated in Fig. 6. The receptacle is now placed in a drier oven, or the core may be otherwise suitably hardened. It is to be noted that for the purpose of insuring a rapid and proper baking of the core the drier-plate 22 is preferably formed with a series of perforations 35 to permit of the ready passage of heat, and also to permit the escape of moisture from the mass of material 34.

In any event, if apparatus similar to that previously described is employed a core will be produced which, as aforestated, will have the configuration illustrated in cross-section in Fig. 6, and this core may obviously be used in conjunction with other cores in a mold, so that upon metal being poured into the latter a finished section of the nature illustrated in Fig. 15 will be produced. More particularly, this section will include—according to the present exemplification—side portions or flanges 36, which are provided by those portions of the core adjacent the edges of the same, and if desired, in conjunction with other cores. The section will further include a nipple 37 provided incident to the space extant between the stem and edge walls of the core, and a screw-threaded opening 38, the thread of which will correspond in pitch and contour to the extended portion of the Fig. 6 type of core, it being finally noted that the convolutions of the thread will be of decreasing circumference, or, in other words, that the opening will be tapered to conform to the degree of taper of the extended core-portion.

In certain instances it may not be desired to utilize a core-box of the nature aforestated in order to provide a female thread, and with this in mind a different form of mechanism may be employed. One of these forms, together with the type of core produced thereby, has been illustrated in Figs. 7 to 10, inclusive. In these views the apparatus takes the form of a drier-plate or platform 39, a collar 40, which is interiorly screw-threaded as at 41, and a cylinder or ring 42, which has exterior threads corresponding to the threads 41 and has its upper edge preferably flanged outwardly, as has been indicated at 43. This cylinder is furthermore formed with threads 46 extending throughout a portion of its inner or bore face, and these threads have obviously a pitch corresponding in pitch to the threads 41 and are shaped to correspond to the threads which are to be produced in the finished casting.

Figure 7:
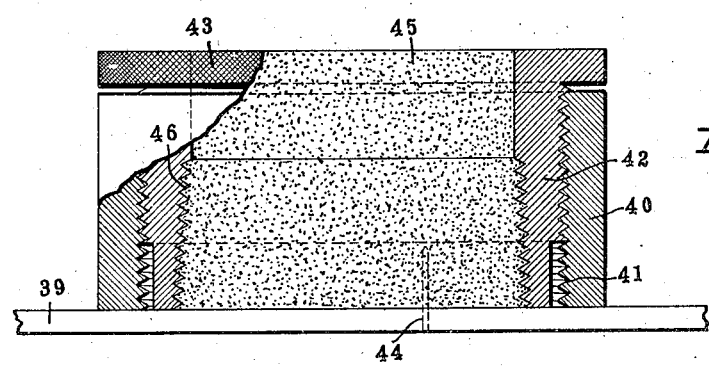
Fig. 7 is a partly sectional side view of an assembled mechanism such as may be employed in producing a core of a desired configuration.
Figure 8:
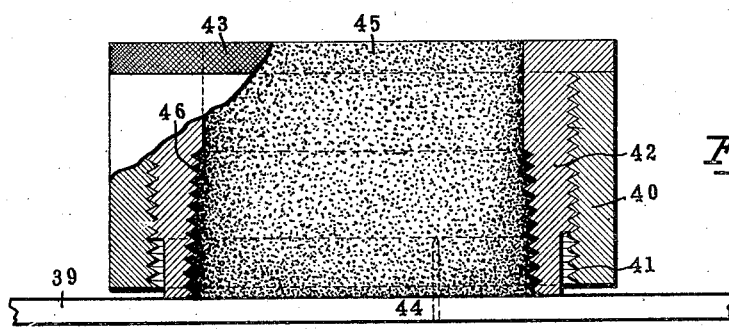
Figs. 8 and 9 are views similar to Fig. 7, but illustrating the parts of the mechanism in different relative stages.
Figure 9:
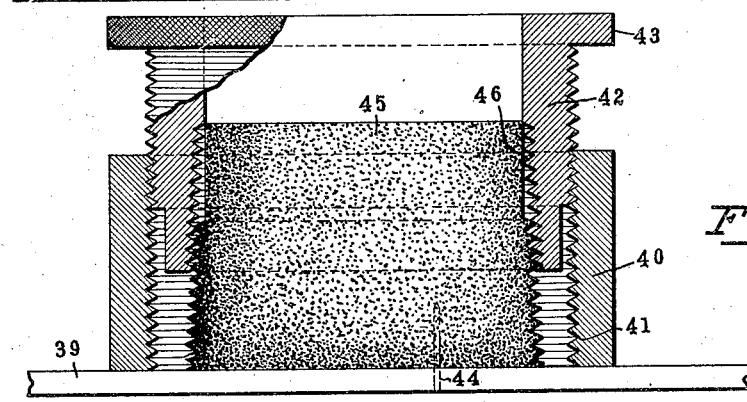

In using a device of this nature the cylinder or ring 42 is threaded into the collar 40 until the lower edges of both of the same lie in substantially the same plane and in contact with the upper surface of the platform 39, as has been best shown in Fig. 7. The platform will in some instances have a projecting portion which extends upwardly within the bore of the cylinder, as for example, a nail or similar protuberance 44, may be driven through the platform and brought to extend into this position, as has been indicated in dotted lines. The bore of the cylinder is now packed with a mass of core-sand 45 of a composition preferably similar to that previously specified, and after this packing has been completed it is in certain instances desirable to slightly turn the cylinder with respect to the collar. By this operation, and due to the fact that the collar is of less height than the effective height of the cylinder, the former will have its lower edge lifted clear of the platform 39 similar to the manner illustrated in Fig. 8. The mass of material 45 during this operation will remain substantially stationary with respect to the plate 39, and as a consequence, due to the fact that, in packing the mass, threads have been formed on the exterior surface of the same, these threads will become more sharply defined and will adopt a configuration identical with that of the threads 46 on the inner face or bore of the cylinder.

It will be observed that similar to the threads on the interior of the cylinder 27 the threads 46—in order to conform to standard practice—are also preferably tapered, and the inner face of the cylinder bore adjacent the upper edge thereof is preferably smooth, for a purpose hereinafter brought out. Thus, if the collar 40 is held against rotation, and the cylinder 42 is retracted by rotating the same with respect to the platform or drier-plate 39, the threads 46 will free themselves from the threads of the mass of material 45, and as a consequence, as has been illustrated in Fig. 9, the cylinder may be "backed off" and it may be lifted entirely clear of the core, subsequently to which, or at the same time, the collar will also be removed from its concentric position with respect to this core.

Figure 10:
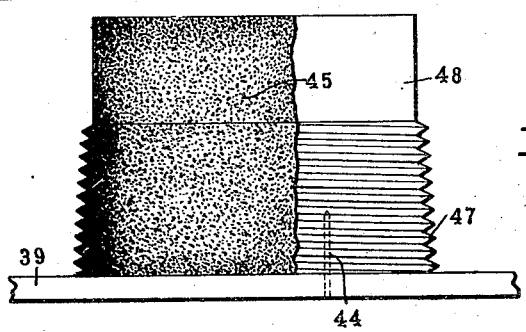
Fig. 10 is a view similar to Fig. 6, but showing the core produced by means of the mechanism illustrated in Figs. 7 to 9, inclusive.

Thus, a core will be provided which, as in Fig. 10, will have surfaces corresponding to the internal surfaces of the cylinder bore. This core will include a body presenting a screw-threaded and tapered portion 47 and a smooth cylindrical upper portion 48, and the drier-plate 39 may be positioned within an oven in order to harden the core. In using a core of this nature, the same may be secured to adjacent core sections in any desirable manner, as, for example, by thin nails commonly utilized for this purpose, or adhesive, etc., etc. It is obvious that when properly positioned and metal poured therearound, a casting will be provided which will be formed with a threaded opening corresponding in all respects to the standard requirements afore-mentioned.

Figure 11:
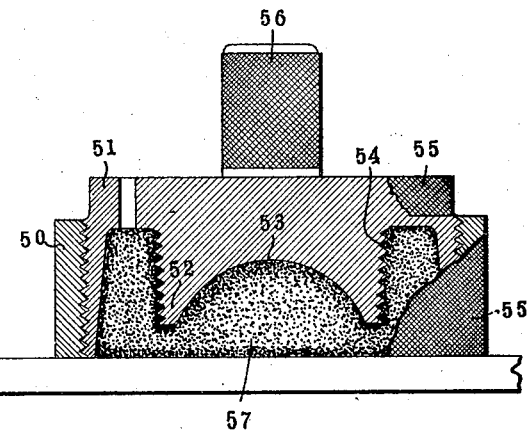
Fig. 11 illustrates partly in section a further mechanism which may be utilized to produce a core for the production of a male-threaded member.
Figure 13:
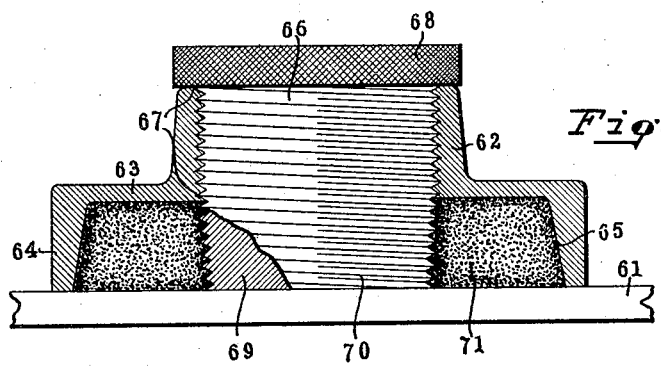
Fig. 13 is a partly sectional view of a further form of mechanism utilized to produce a male-threaded member.

In certain instances it is desired to provide male threads, and with this in mind apparatus of the nature illustrated in Figs. 11 and 13 may be utilized. In the first of these views it will be noted that a platform 49 is provided, upon which an interiorly-threaded collar 50 is positioned. Disposed within this collar and exteriorly threaded to engage the threads of the same is a cap 51, which in the present instance is formed with an extension 52 having a concaved base 53 and having threads 54 corresponding in pitch to the threads associated with the other portions of the mechanism, and in turn, being of a configuration corresponding to the configuration desired in the finished casting. It will also be noted in this connection that in the present instance the extension 52 is tapered to conform to standard practice.

In using an appliance of this nature the cap is threaded into the collar, and these elements may be moved relatively to each other, preferably by having them provided with knurled outer surfaces 55, the cap, if desired, also carrying a knurled stem 56, by means of which it may be more conveniently manipulated. After the parts have been properly disposed they are inverted so that the operator has before him a cup within which a mass of core-sand 57 is packed, this mass being smoothed off and being retained in position until it is supported in the manner indicated in Fig. 11 upon the drier-plate or platform 49. It will be understood that, due to the fact that the extension 52 terminates in a plate short of that occupied by the outermost edge of the cap 51, an unbroken surface of core-sand will be presented.

The operator may now grasp the collar 50 and rotate the cap relatively thereto so as to "back off" the latter, it being understood that incident to the tapered form of the extension 52, and also due to the fact that the inner face of the annular flange of this cap is tapered, the mass of sand will not key or be retained within the cap. During the final stages of this "backing-off" operation the cap, together with the collar—or independently of the same—may be lifted clear of the drier-plate or platform, and this element, together with the core or cores supported thereby is placed in a drier oven, or the cores are otherwise suitably treated, in order to properly condition the same for the casting operation. During this "backing-off", it will be observed that the collar serves as a guide, and a core will be produced by this apparatus similar to that illustrated in Fig. 12, which core includes a body 58 having a central interiorly-screw-threaded depression or recess 59, the base of which is convex as at 60, and obviously corresponds to the concavity of the face 53 of the extension 52.

Forms of apparatus different from that illustrated in Fig. 11 may also be advantageously employed in order to produce a casting with male threads. Attention is invited, for example, to Fig. 13, in which an apparatus has been illustrated which in certain respects is more advantageous than that shown in Fig. 11. In the former figure it will be noted that a platform 61 is employed corresponding to the platform 49. Upon this platform there is illustrated a collar 62, which has its lower edge prolonged in the form of an outwardly- and downwardly-extending flange, as has been indicated at 63 and 64, respectively, it being noted that the inner surface of the downwardly-extending flange portion has been tapered as at 65. The collar 62 is interiorly screw-threaded, and a plug 66 is adapted to be positioned within this collar and to be retained in this position incident to the fact that it is formed with a series of threads 67 which correspond to the threads of the collar. The upper end of the plug is preferably formed with a knurled flange 68, by means of which it may be moved relatively to the collar and associated parts, and the body of the plug has an extension 69, which in the present instance is tapered and is formed with a series of threads 70 corresponding to the threads which are to form a part of the finished casting.

In using an appliance of this character the operator places the plug within the collar and moves these parts relatively to each other until the extension 70 projects fully into the enclosure provided by the flange portion 63 and 64. The appliance is now inverted, so that a cup is presented similar to that extant in connection with the device illustrated in Fig. 11, and from the base of the cup the extension 69 projects upwardly. Core-sand or other suitable material is now rammed home to occupy the space extant between the extension 70 and the inner faces of the flange. The plate or platform 61 is applied to the upper face of the device after the sand has been properly leveled off, and the apparatus is reversed to occupy the position illustrated in Fig. 13. Thereafter, using the collar and associated parts as a guide and retaining the same fixed with respect to the platform 61, the plug 66 is withdrawn by rotating the same, with the assistance of the knurled flange 68. After the extension 69 has been retracted within the collar 67, the latter, together with the plug, may be lifted clear of the mass of material 71, which is subsequently treated by heat or in any other suitable manner in order to produce the finished core having in the present instance the configuration illustrated in Fig. 14, in which it will be noted that the core includes what might be termed a ring-shaped body 72 having a tapered and threaded internal bore 73 corresponding to the degree of taper and the threads of the extension 69, and also having its outer edge tapered or beveled as at 74 to correspond to the face 65 of the flange portion 64.

With a view to reducing the amount of unnecessary illustration, it will be perceived that in the present exemplification the finished castings produced by the use of the cores illustrated in Figs. 10 and 14 have been omitted, in view of the fact that the appearance of this product will be obvious to those conversant with the art. However, one form of male-threaded member has been shown, to wit: that which may be produced by the use of the core shown in Fig. 12. This member is in the present exemplification in the nature of a plug, as has been illustrated in Fig. 16, and includes a body 75 having a tapered screw-threaded outer face which corresponds to the degree of taper, and the threads of which also correspond to the threads of the recessed portion 59 of the Fig. 12 core. The lower face of this plug will, in the present instance, be concaved as at 76 to correspond to the convex base portion 60 of this core, and thus in all respects the body portion of this plug will be a faithful reproduction of the extension 52 shown in Fig. 11.

Finally, with reference to the mechanism utilized, and the cores produced in this exemplification of the invention, it will be perceived that in each instance the collars serve as guides for the cylinders or extensions during the retraction of the latter from the core. Furthermore, while it is not essential it is, nevertheless, preferred—as has been illustrated—that the cylinders and extensions be so formed adjacent their outer ends that the corresponding castings formed by the cores produced by this mechanism will not have their threaded portions beginning exactly at their outermost ends. By this expedient a buggering of the threads is prevented.

Obviously, the apparatus may be changed in numerous particulars in order to meet the various requirements to which it may be subjected, not alone with reference to the metal casting art, but also with respect to other industries. It will also be appreciated that the parts may be employed over indefinite periods of time, it being merely necessary in certain instances to brush or wipe the threads of the cylinders or extensions with kerosene or some other suitable wash, which is done particularly to coat these parts with a film of fluid in order to enhance the freeing action between the threads of the core and the part which has formed these threads.

Quite independent of the fact that by means of the present invention it is practicable to form members with screw-threads at the time of their production, it will be noted, with particular reference to the metal casting industry, that the necessity of machining members and portions after they have been cast, and the consequent damage in breakage, as well as general expense involved incident to such machining operations, is avoided.

Also, regardless of this saving it will be understood—again with particular reference to the metal casting industry—that the threads will be continuous and incident to the fact that by the practice of this invention it is no longer necessary to machine threads, the threads produced by means of this invention will have a "scale" surface. Thus, instead of the "scale" being cut throughout, incident to the machining operations, this extremely desirable surface will remain intact, and consequently, it may be said that in almost all instances the thread produced by the present method will not alone be the equivalent of a machine thread, but will, in fact, be far superior to the same.

From the foregoing it will be appreciated that the objects of this invention have been accomplished, and since certain changes in carrying out the above process, and certain modifications in the article which embody the invention may be made without departing from its scope, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described our invention, what we claim as new and desire to secure by Letters Patent is:

1. As an article of manufacture, a core for use in casting screw-threaded articles and to be used in conjunction with other cores in a mold, said core including a body having a surface formed with an uninterrupted screw thread, the individual convolutions of said threads being of decreasing diameter and portions extending from said body for association with other core bodies.

2. As an article of manufacture, a core for use in casting screw-threaded articles and to be used in conjunction with other cores in a mold, said core including a body having a surface formed with an uninterrupted screw thread, the individual convolutions of said threads being of decreasing diameter, the last convolutions of the thread terminating at points short of the ends of said core and portions extending from said body for association with other core bodies.

3. As an article of manufacture, a core including a tapered stem formed with an uninterrupted screw thread and outwardly-extending portions at the base of the stem for association with cores to be arranged adjacent thereto.

4. A method of producing a core which includes packing core material into intimate contact with a screw-threaded surface which is free from joints and other interruptions, and thereafter moving said material and surface relative to each other and substantially instantaneously freeing the entire surface from contact with the threads formed in the core.

5. A method of producing a core which includes packing core material into intimate contact with a surface formed with screw threads terminating short of its end and such surface being free from joints and other interruptions, thereafter moving said material with respect to such surface and substantially instantaneously freeing the material and surface from contact with each other.

6. A method of producing a core which includes packing core material into intimate contact with an annular surface having upon its inner face uninterrupted screw threads, the convolutions of which are of constantly decreasing diameter to thus provide a tapered core stem upon the outer face of which is a screw thread, such method further including the extension of core material adjacent the base of the stem to provide core portions for association with the body or bodies of other cores.

7. A method of producing a core which includes packing core material into intimate contact with an annular surface having upon its inner face uninterrupted screw threads, the convolutions of which are of constantly decreasing diameter to thus provide a tapered core stem upon the outer face of which is a screw thread, such method further including the interrupting of the thread at a point short of the base of such stem.

8. As an article of manufacture a core including a tapered stem formed with an uninterrupted screw thread upon its outer face, such thread terminating at a point short of the end of said stem.

In testimony whereof we affix our signatures.

JOSEPH VIRGIL PUCCINI.
WILLIAM L. GUISE.